United States Patent [19]

Miller

[11] 4,254,717
[45] Mar. 10, 1981

[54] GARDENING IMPLEMENT FOR IRRIGATION

[76] Inventor: James F. Miller, 1156 Ashmount Ave., Oakland, Calif. 94610

[21] Appl. No.: 969,186

[22] Filed: Dec. 14, 1978

[51] Int. Cl.³ ............................................ A01C 23/02
[52] U.S. Cl. ..................................................... 111/7.1
[58] Field of Search ................... 111/7.1, 7.2, 7.3, 7.4, 111/89, 4, 6, 7; 47/48.5; 175/393, 421, 422

[56] References Cited

U.S. PATENT DOCUMENTS

| | | | |
|---|---|---|---|
| 1,640,587 | 8/1927 | Whisler | 175/387 X |
| 1,925,266 | 9/1933 | Anderson | 111/7.1 |
| 2,218,130 | 10/1940 | Court | 175/393 X |
| 3,142,273 | 7/1964 | Dilts | 111/7.1 |
| 3,326,306 | 6/1967 | Weir | 111/7.1 X |
| 3,598,068 | 8/1971 | Rosendahl | 111/7.1 |
| 3,903,815 | 9/1975 | Winkler | 111/1 |

Primary Examiner—James R. Feyrer
Attorney, Agent, or Firm—Bruce & McCoy

[57] ABSTRACT

A gardening implement comprising a hollow rod having a straight portion, a curved handle portion, and a tapered lower end with a discharge opening at the lower end, a pair of flanges extending beyond the lower end of the rod and connection means on the upper end of the rod for connecting it to a standard garden hose.

3 Claims, 4 Drawing Figures

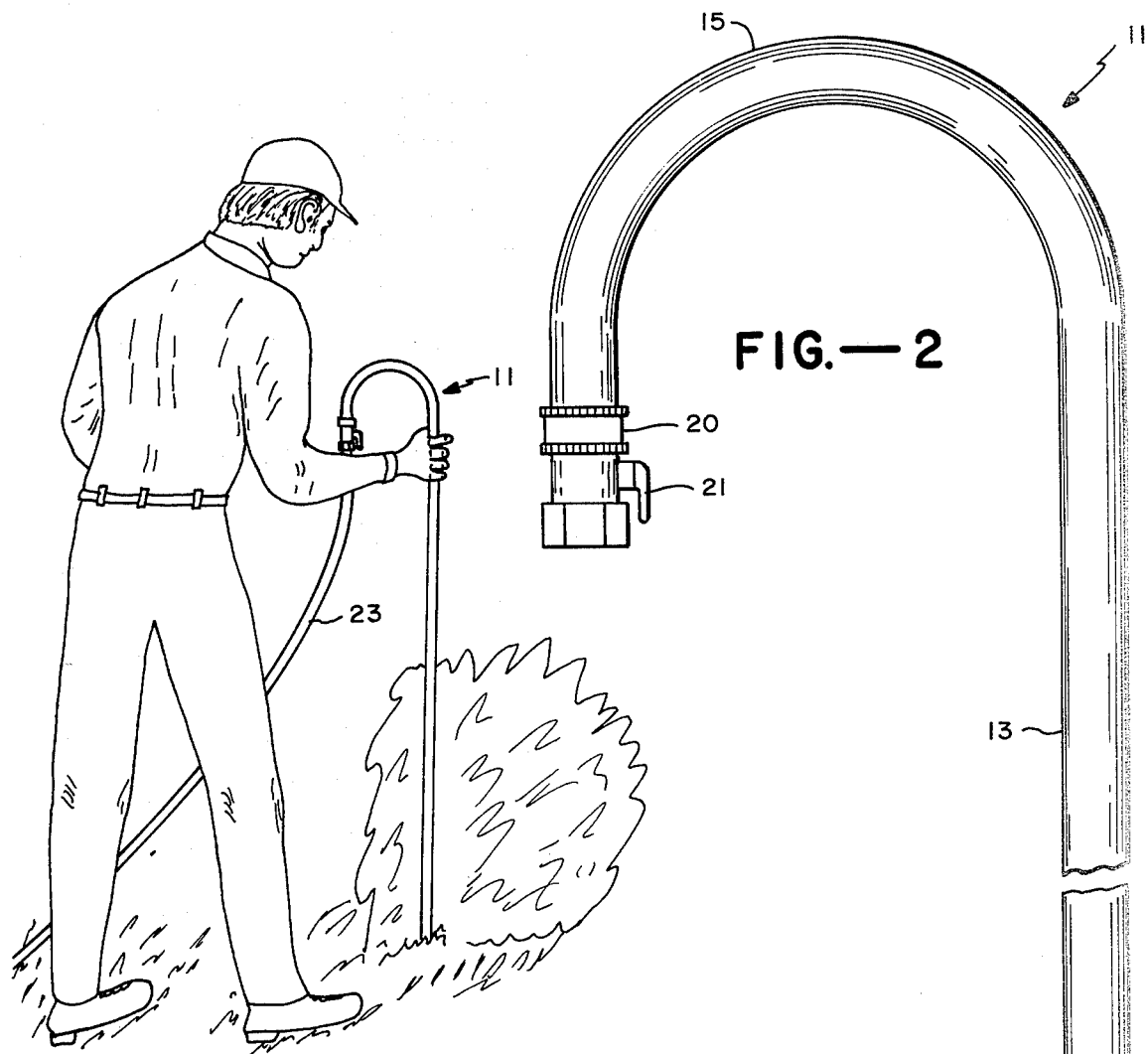
FIG.—1
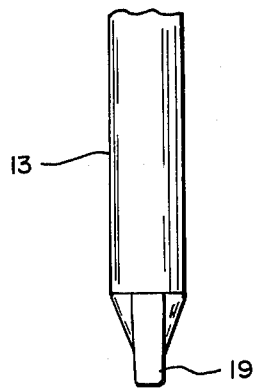
FIG.—3

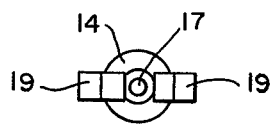
FIG.—4

GARDENING IMPLEMENT FOR IRRIGATION

BACKGROUND OF THE INVENTION

1. Field of the Invention

The present invention relates to gardening implements and more particularly to multi-purpose gardening implements used for precision watering.

2. Description of the Prior Art

Under certain climatic and soil conditions it is difficult to effectively provide water for the roots of plants by merely moistening the surface soil around the plants. During a drought or dry period, if only the surface is irrigated, a great deal of water is lost through evaporation before it reaches the roots of the plants. There is also a problem of uniform absorption of moisture by the roots when the soil is hard and caked. Thus to insure that the roots of the plants are receiving the required moisture, under even difficult conditions, it is desirable to irrigate the root systems directly.

There have been several attempts in the prior art to provide tools which will carry moisture to the depth of the plant root systems. U.S. Pat. No. 2,018,003 issued to L. E. Axtell describes a pitchfork type device with sprinkling holes in tubular tines for the release of water below the surface. However, the depth to which this tool can be inserted into the ground is limited by its pitchfork structure. Another problem of Axtell's device and other prior art tools is that the discharge openings are particularly susceptible to clogging, which prevents the uniform release of water. In addition, this device is relatively cumbersome and difficult to construct.

Another prior art device which attempts to solve the problem of irrigating roots located deeply below the ground surface is that described in U.S. Pat. No. 3,326,306 issued to B. B. Weir. Although this device appears to reach a root system at any depth it has a wide yet relatively thin arrowhead digging blade which would disrupt a great deal of the soil system in reaching its roots. Because of its particular structure and attachment, it is expected that the digging blade of this device would be particularly vulnerable to detachment from the shaft in hard soil surfaces or upon striking rocks. The device of this patent is also not adaptable to a simple construction from inexpensive material.

There is also a need for a watering implement which can also be used for precision irrigating of the ground surface around delicate plants where the tops must be avoided or where access is difficult.

The gardening implement of the present invention provides a solution to these prior art problems. It is designed so that it can be constructed simply and inexpensively of a material sturdy enough to be used in any kind of soil conditions. The garden tool of this invention is particularly designed so that its digging end can be forced into the ground to reach root systems of a considerable depth with a minimum of effort while disrupting a minimum amount of soil around the root system. Because of its unique structure, the opening for release of water is protected from clogging under most conditions, thereby allowing more efficient and uniform below-surface irrigation of plant roots.

The gardening implement of the present invention is a multi-purpose tool which is versatile and also provides for precision watering of the ground surface, as well as area watering and watering of distant or hard to reach plants.

SUMMARY OF THE INVENTION

The present invention is a gardening implement which has an elongated hollow rod. The rod has a substantially straight portion and a curved portion forming a handle for the user at the upper end. At its lower end the rod is tapered and has a restricted opening which is smaller than the internal diameter of the rod for the discharge of water from its lower end. At least one pair of flanges is mounted longitudinally on the rod on opposite sides of the rod along its tapered portion. These flanges extend partially beyond the end of the rod and are only slightly larger in span than the diameter of the rod. Connection means are mounted on the upper end of the rod for connecting the rod to a standard garden hose or other water source.

OBJECTS OF THE INVENTION

It is therefore an important object of the present invention to provide a lightweight gardening implement which may be constructed simply and inexpensively in main part from a common material such as continuous uniform conduit.

It is another object of the present invention to provide a gardening implement which may be used to water root systems located deeply in the ground with a minimum of effort by the user and with a minimum of disruption to the surrounding soil systems.

It is a further object of the invention to provide a manual gardening implement which can be connected to any standard garden hose and will efficiently provide water to the root systems of plants to a considerable depth.

It is yet a further object of the invention to provide a gardening implement which will provide a controlled flow of water to the ground surfaces and root systems of plants with a minimum amount of clogging or breakage of the tool.

It is yet another object of the invention to provide a multi-purpose garden irrigation tool which permits discriminate watering of individual plants and which can be used to produce a stream of water to reach distant plants.

Other objects and advantages of the invention will become apparent when it is considered in conjunction with the accompanying drawings described hereafter.

DESCRIPTION OF THE DRAWINGS

FIG. 1 is a perspective view of the gardening implement of this invention as it may be used by the operator;

FIG. 2 is a side elevational view of the present invention;

FIG. 3 is a front elevational view of the lower portion of the implement of FIG. 2.

FIG. 4 is a bottom plan view of the lower portion of the implement of FIG. 2.

DESCRIPTION OF THE PREFERRED EMBODIMENT

The present invention is a gardening implement 11 which comprises an elongated hollow rod having a substantially straight portion 13 and a curved portion 15 forming a handle for the user at the upper end of the rod. In the preferred embodiment, the upper end of the rod is curved so that it resembles a walking cane as shown in FIG. 2. The rod may be easily gripped by the user either at the top of the curved portion of the cane or at some other portion along the handle as shown in FIG. 1. Of course it is understood that the upper portion of the rod may be curved in any particular style so that it may be conveniently connected to a water supply but so that the hose will not interfere with the free use of the implement.

The elongated hollow rod 11 also has a substantially straight portion 13 which in the preferred embodiment is all in one piece with the curved portion 15. This straight portion is tapered at its lower end 14 and it has a restricted opening 17 smaller than the internal diameter of the rod for the discharge of water at the lower end thereof. In the preferred embodiment, the rod is tapered at its lower end to a diameter which is between one-third and two-thirds the diameter of its non-tapered portion. Reference herein to the tapered end of the hollow rod is intended to include embodiments wherein the tapered portion may be formed from the same conduit as the straight portion 13 and embodiments in which a separate piece of rod or other pretapered piece of metal is integrally secured to the straight portion and forms a tapered end thereof.

At least one pair of flanges 19 is mounted longitudinally on the rod 11 on opposite sides of the rod along its tapered portion, said flanges extending partially beyond the end of the rod. These flanges may be integrally formed from the same material as the tapered end. They are mounted so that their width (in side elevation) increases as the tapered end becomes more narrow. The flanges thus fit fairly closely to the general shape of the elongated rod and facilitate the easy insertion and removal of the gardening implement in the soil with a minimum of disruption. The flanges are only slightly larger in span than the diameter of the rod. When used in this context, the term, "span", refers to the complete width in side view of the flanges mounted on opposite sides of the elongated rod. Thus, in FIG. 2 the span of the flanges would be a distance measured from the outer left edge of the left flange to the outer right side of the right flange, this distance including the widths (in side elevation) of both flanges and the diameter of the tapered portion of the rod. When referred to herein, unless otherwise specified, "diameter" of the elongated rod refers to the outer diameter of the rod measured at a point along its non-tapered portion. The span of the flanges is between 1 and 1.5 times the diameter of the hollow rod.

The length of the flanges 19 may vary between 0.5 and 1.5 times the diameter of the hollow rod 11. The length of the flanges refers to a distance measured parallel to the hollow rod 13 from the highest point of attachment or commencement of the flanges on the rod to the point of termination beyond the end of the rod. In the preferred embodiment the flanges are mounted so that they extend beyond the end of the rod a distance between ⅛th and ½ the diameter of the hollow rod. It is the extension of these flanges beyond the elongated rod outside of its discharge opening 17 that protects this opening from clogging. It is to be understood that another pair of flanges may be similarly mounted longitudinally on opposite sides from each other approximately 90° from the first pair of flanges. An excessive number of flanges would not be preferred, however, because it is desirable to allow the soil to be pushed past the tip of the elongated rod during the course of digging.

Connection means 20 are mounted on the upper end of said rod for connecting the rod to a standard garden hose 23 or other water source. The connection means may be any simple threaded fitting for a standard hose which is permanently secured to the end of the curved portion of the hollow rod, as illustrated in FIGS. 1 and 2.

Valve means 21 may be disposed between the connection means 20 and the water source and arranged for controlling the flow of water through the rod. Generally, the valve means may be any common control valve, readily available in the trade which is fitted onto the connection means so that water will flow freely from a garden hose into and through the hollow rod, subject to being manually reduced or shut off by the user.

In the preferred embodiment the main part of the gardening implement of this invention is constructed from a continuous piece of uniform conduit or similar piping or tubing which may be formed into the shape of a cane. Because its unique configuration allows the use of easily available material and the purpose of the implement is accomplished with few joints and fittings, the costs of construction are thereby substantially reduced. The conduit which is used in the preferred embodiment has an outer diameter of approximately 11/16 inch (1.746 cm) and a wall thickness of approximately 1/16 inch (1.58 mm). In the preferred embodiment, the rod 11 is approximately 48 inches high, (1.219 m), from the top of its curved portion 15 to its bottom end, and the distance of the curved portion 15, measured perpendicular to the straight portion 13 from the commencement of the curve to its other end, is approximately 9 inches (22.860 cm) center to center. In using a rod with an outer diameter of 11/16 inches (1.746 cm), the outer diameter of the restricted opening at its most tapered point is approximately 5/16 inches (0.793 cm).

In the preferred embodiment the width of each flange at its widest portion is approximately 3/16 inches (0.474 cm). The thickness of the flange (from the front elevational view) is also approximately ¼ inch (0.635 cm) at its widest part. The flange length in this preferred embodiment may be 11/16th to ¾ inch, (1.746 to 1.905 cm) and each flange may extend approximately ¼ inch (0.635 cm) beyond the end of the elongated rod.

In the preferred method of construction a tapered head portion 14 is preformed or molded so that its lower end will be tapered and an upper end will fit snugly into the hollow rod, where it is welded in place, thus providing a secured digging head for the implement and permitting an efficient method of construction.

Several advantages result from the simple configuration of this invention. Because its handle and shaft end may be formed quite easily from one continuous piece of tubing or conduit and the number of joints and additional fittings are thereby reduced, the manufacture of the present invention is more convenient and less expensive and the implement itself is less cumbersome than those in the prior art. Because it utilizes standard fittings to an ordinary garden hose and any common connection and valve means for controlling the flow of the water from the garden hose, its use is very simple and convenient for the average gardener.

Another advantage of the present invention is that, unlike many of the prior art devices, the flow of water through the gardening implement will be continuous and unrestricted by soil clogging the water discharge opening, which would interrupt the irrigation process.

The particular configuration and attachment of flanges to the lower digging end of the gardening implement of this invention makes possible easy insertion of the implement into the soil without the serious disruption of the soil system which is a problem of many of the prior art devices. Yet this device is sturdy enough to be effective in most soil conditions.

There is no limitation to the depth to which this gardening implement may be inserted up to the length of the straight portion nor is there a limitation to the angle at which it may be used, which makes it very versatile. Likewise the close fit of the flanges to the elongated rod allow easy removal from the soil at any angle as well.

In addition, this implement may be used very effectively for spot irrigation above ground, when discriminate watering is required, for example, for plants where the tops should not be watered or for distant plants or others located in hard-to-reach places. Thus the instant invention provides a gardening implement which is versatile and allows an improved precision irrigation of plants at ground surface as well as below surface root systems with efficiency and convenience for the user and the minimum of disruption of the soil around the plants or interference with the watering process. While the invention has been described in detail it is not to be limited to the preferred embodiment set forth except as maybe necessitated by the appended claims.

I claim:
1. A gardening implement comprising
   an elongated hollow rod formed from a continuous piece of conduit and having a substantially straight portion and a curved portion forming a handle for the user at the upper end of the rod, said rod being tapered at its lower end to a diameter between one-third and two-thirds the diameter of its non-tapered portion, said rod having an opening for the discharge of water at said lower end,
   at least one pair of flanges mounted longitudinally on said rod on opposite sides thereof along the tapered portion thereof and extending beyond the end of said rod a distance betewen one-fourth and one-half the diameter thereof, the outer sides of said flanges being tapered inwardly and downwardly and the inner sides of said flanges being substantially straight so that said flanges abut said discharge opening without obstructing said opening, the span of said flanges being between 1 and 1.5 times the diameter of the hollow rod, the length of said flanges being between 0.5 and 1.5 times the diameter of the hollow rod,
   connection means mounted on the upper end of said rod for connecting said rod to a source of water, and
   valve means disposed between said connection means and said water source and arranged for controlling the flow of water through the rod.
2. The gardening implement of claim 1 wherein the thickness of each flange may vary between one-fourth and two-thirds the diameter of the hollow rod.
3. The gardening implement of claim 1 wherein the opening for the discharge of water is generally circular and is disposed at the bottom end of the elongated rod.

* * * * *